(12) United States Patent
Berson et al.

(10) Patent No.: US 6,905,091 B2
(45) Date of Patent: Jun. 14, 2005

(54) SYSTEM AND METHOD FOR CONTROLLING THE ACOUSTIC SIGNATURE OF A DEVICE

(75) Inventors: Barry L. Berson, Northridge, CA (US); Larry J. Bialecki, Canyon Country, CA (US); Peter A. Buck, Valencia, CA (US); John M. Morgenstern, Lancaster, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/619,848

(22) Filed: Jul. 14, 2003

(65) Prior Publication Data

US 2005/0098681 A1 May 12, 2005

(51) Int. Cl.$^7$ .......................... B64D 47/00; H04B 15/00
(52) U.S. Cl. ...................... 244/1 N; 244/194; 340/965; 381/94.1
(58) Field of Search ................................ 244/194, 1 N, 244/174, 175; 340/963, 965; 381/59, 94.1, 94.9

(56) References Cited

U.S. PATENT DOCUMENTS

| | | | | |
|---|---|---|---|---|
| 4,887,298 A | * | 12/1989 | Haigler | 381/55 |
| 4,908,868 A | * | 3/1990 | McTaggart | 381/59 |
| 5,023,847 A | | 6/1991 | Lee | 367/136 |
| 5,221,185 A | * | 6/1993 | Pla et al. | 416/34 |
| 5,226,089 A | * | 7/1993 | Yoon et al. | 381/96 |
| 5,551,649 A | * | 9/1996 | Kaptein | 244/1 N |

OTHER PUBLICATIONS

Rogers, Andy S., Analyzing Sonic Boom Footprints of Military Jets, http://gis.esri.com/library/userconf/proc01/professional/papers/pap284/p284.htm., pp. 1–16 AOT Inc.

* cited by examiner

Primary Examiner—Robert P. Swiatek
(74) Attorney, Agent, or Firm—Koestner Bertani LLP; Mary Jo Bertani

(57) ABSTRACT

A system receives information regarding current flight conditions of a device such as an aircraft and determines the acoustic level of the sonic boom and/or other noise generated by the device during operation. The current acoustic level is compared to a desired level, and various cues are displayed to operators regarding corrective actions that can be taken to reduce or maintain the acoustic level at the desired level. The system also predicts future acoustic levels based on current operating conditions, and varies the urgency of the cues based on whether and how quickly the device will exceed the desired acoustic level. Options to limit maneuvers and to automatically adjust operating condition parameters can be enabled. Options to display additional information regarding past, current, and predicted acoustic levels can also be selected. Signals that can be used to automatically control the acoustic level of a device during operation can also be generated for use in devices that can operate autonomously.

28 Claims, 8 Drawing Sheets

SYSTEM AND METHOD FOR CONTROLLING THE ACOUSTIC SIGNATURE OF A DEVICE

BACKGROUND OF THE INVENTION

When an object such as an airplane travels through air, the movement of the plane causes a pressure disturbance that moves at the speed of sound. By way of example, the sound waves created by the nose of the plane will travel in an outward direction away from the aircraft. The air ahead of the plane receives the sound waves before the arrival of the aircraft, so that when the aircraft arrives, the air flows around the plane. As the airplane approaches the speed of sound, the sound waves merge closer and closer together at the front of the plane. When the aircraft is moving at the speed of sound the sound waves merge together into a "shock wave" which is an almost instantaneous line of change in pressure, temperature and density.

An aircraft traveling at supersonic speed will generate a bow shock wave from the nose of the airplane and a tail shock wave created by the tail of the plane. The tail shock wave is created by an under pressurization in the air about the tail. The overall shock wave pressure gradient extends from an over-pressure area beneath the forward portion of the plane and an under-pressure area beneath the aft section of the aircraft. Pressure disturbances generally coalesce into an N-wave shape that has the largest shock magnitudes at the inflection points of a pressure gradient curve. Since the front of a supersonic aircraft generates an increase in ambient pressure, and the rear generates a decrease in pressure, the variation in propagation speed causes aircraft pressure disturbances to stretch out as they propagate to the ground. As the disturbances stretch out, they also tend to coalesce because shocks waves travel halfway between the speed of the lower pressure ahead and higher pressure behind.

The shock waves travel through the atmosphere to the ground. To an observer, the shock waves are felt as an abrupt pressure compression followed by gradual decompression and ending in an abrupt pressure compression back to ambient. The abrupt compressions (also known as shocks) create a disturbingly loud sound. Additionally, the shock waves may cause structural damage to surrounding buildings.

Sonic booms are often measured in pounds per square foot (psf) of overpressure. Overpressure is the increase over normal atmospheric pressure (2,116 psf). One pound of overpressure would not be expected to produce damage to structures. Sonic booms may cause minor damage such as shattered glass but structurally sound buildings should not suffer damages from overpressures less than 16 psf. Sonic boom exposure to communities typically does not exceed 2 psf. Some public reaction could be expected between 1.5 and 2 psf. Rare minor damage may occur with 2 to 5 pounds overpressure.

Supersonic flight over land by civil aircraft is prohibited in the United States. The current regulations applicable to supersonic aircraft are found in 14 CFR part 36, Subpart D, "Noise Limits for Supersonic Transport Category Airplanes," and 14 CFR part 91, Subpart I, "Operating Noise Limits." The regulations require that the noise levels of the airplane must be reduced to the lowest levels that are economically reasonable, technologically practicable, and appropriate for a supersonic design. Part 91 prohibits civil aircraft operation at greater than Mach 1 over the United States. Part 91 also imposes flight limitations to ensure that civil supersonic flight entering or leaving the United States will not cause a sonic boom to reach the surface within the United States. Supersonic Transports (SSTs) are therefore restricted to supersonic flight across water, thereby limiting the usefulness of the planes.

In 1990, the FAA proposed to amend the type certification noise standards and noise operating rules for future generation civil supersonic airplanes. After analyzing the comments received on the Notice of Proposed Rulemaking (NPRM), the FAA determined that further investigation and research was necessary before a final rule could be developed. Accordingly, the FAA withdrew the proposed rule and instead issued a policy on noise issues involving the development of future generation civil supersonic transport airplanes. It is likely that new regulations will be adopted in the future that allow supersonic flight over the United States provided that the sound pressure levels caused by the aircraft at ground level are within an acceptable limit.

Shock waves, and thus sonic booms, are fundamental to supersonic flight and can be minimized, but not eliminated, on aircraft that generate lift forces during flight. A significant finding from past sonic boom studies is that startle, rattle, and building vibrations (which can cause damage) are key elements in determining the response of the public to sonic booms. Pressure disturbances of less than 1.0 lb/ft2 will produce less startle, rattle, and building vibrations. NASA's High Speed Research Program identified three key requirements for overland supersonic flight: (1) establishing the criteria for an acceptable "shaped" sonic boom signature, (2) designing a viable aircraft to produce that shaped signature, and (3) quantifying the influence of the atmosphere on such signatures.

With the likelihood of supersonic flight being allowed over the United States in the future, it is desirable to provide systems to alert crewmembers of the level of sonic boom disturbance that have been caused, and are likely to be caused, under current flight conditions. It is also desirable to provide cues to the crewmembers indicating modifications to the flight condition that could lessen the severity of the disturbance. In some circumstances, it is also desirable to limit a pilot's ability to execute maneuvers that would cause sonic boom disturbances above a predetermined level, except under certain situations, such as emergency conditions. Additionally, engine and airframe noise around the airport and during climb could also be handled by such a system to improve airport and community noise abatement.

SUMMARY OF THE INVENTION

In one embodiment, a system for controlling the acoustic signature of a device comprises a processor operable to receive information regarding the flight condition of the device during operation, and to determine the current acoustic level of the device based on the current operating condition information. The processor generates a signal indicating the acoustic level, and further generates information that can be used to control the operating condition of the device to achieve a desired acoustic level.

In another embodiment, a method for providing information to control the acoustic signature generated by an aircraft includes determining the current acoustic level of the aircraft based on current flight condition information. Information regarding the acoustic level is provided to crewmembers as well as to an automated flight control system. The crewmembers use cues based on the information to control the flight condition of the aircraft to remain at or below a desired acoustic level. The crewmembers can also select options to allow the flight control system to automatically control the flight conditions of the aircraft to remain at or below the desired acoustic level.

In a further embodiment, an aircraft includes a sensor system that provides information regarding the current flight condition of the aircraft. A processor in the aircraft determines the acoustic level generated by the aircraft during flight based on the information from the sensor system. The processor also generates cues to indicate the current and expected acoustic levels based on planned maneuvers of the aircraft along a route.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1:
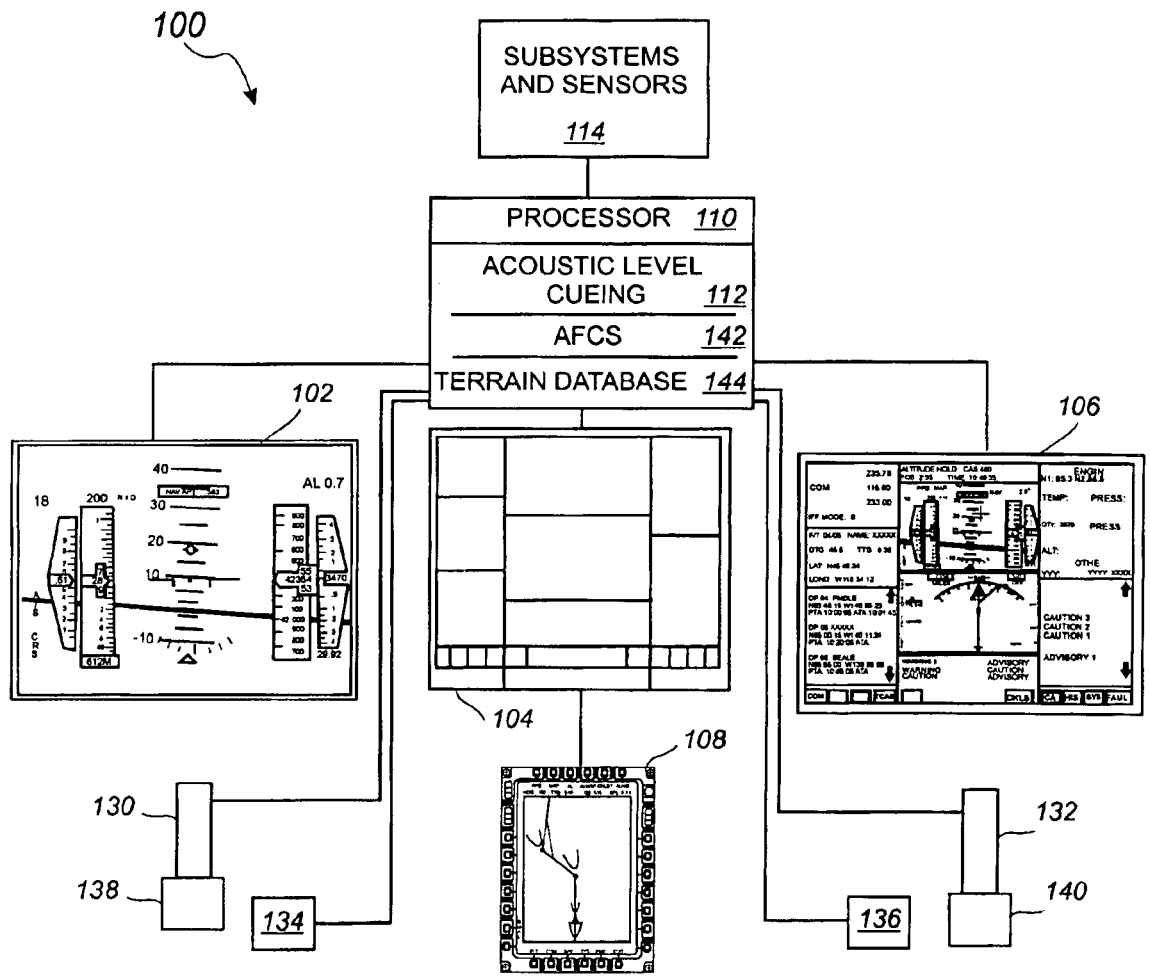
FIG. 1 is a diagram of an embodiment of a processing system with an option selected to display acoustic pressure level information overlaid on a map of the area along the aircraft's planned flight route.

Referring to FIG. 1, a diagram of an embodiment of processing system 100 capable of generating aural, tactile, and visual cues regarding the strength of an aircraft's acoustic signature and shock wave as the aircraft approaches and enters supersonic regimes. Various cues can be presented via lights, buzzers, small high frequency movements on control grips, and one or more crewstation displays 102, 104, 106, 108.

Processor 110 executes APL cueing logic 112 to analyze the operational state, the surrounding environment, and the planned flight route, of the aircraft. Cues generated by APL cueing 112 can inform the pilot of current, past, and predicted acoustic levels, as well as action to take to reduce the strength of the acoustic signature to a pre-specified, or desired, level. One or more of the cues can be color-coded. For example, cues can be green to indicate that the strength of the shock wave is within a desired level; yellow to indicate that the strength of the shock wave is likely to exceed the desired level at the current operational state, or is within a predefined tolerance of, the desired level; and red to indicate that the strength of the shock wave has exceeded the desired level. Other colors, and significance to the colors, can be utilized.

Various sizes and shapes of cues can be utilized to convey different information regarding of the acoustic signature, and to indicate action to be taken by the pilot to reduce the strength of the acoustic signature to a desired level. For example, acoustic cueing symbols can dynamically grow or reduce in size, and/or change shape, based on whether changes in the attitude of the aircraft cause the shock wave to be focused or diffused. Additionally, a variety of aural and tactile cues can be utilized, based on the urgency of the flight condition and the acoustic level of the shock wave.

For airport noise abatement, processor 100 can determine the engine throttle settings and other operating parameters that can be used to calculate the acoustic signature along the planned route. The noise during takeoff can be cued, displayed and controlled similar to sonic boom shock wave examples. Information regarding the flight conditions can be used to determine acoustic levels that would signal cues for control of the acoustic signature. Further, acoustic level signals can be used by a crewmember and an automated flight system to control the aircraft flight condition to remain at or below a desired acoustic level. Cues can be generated indicating current and expected acoustic levels based on a planned flight route. Modifications to the planned flight route could be made, based on the cues, for noise abatement.

Figure 2A:
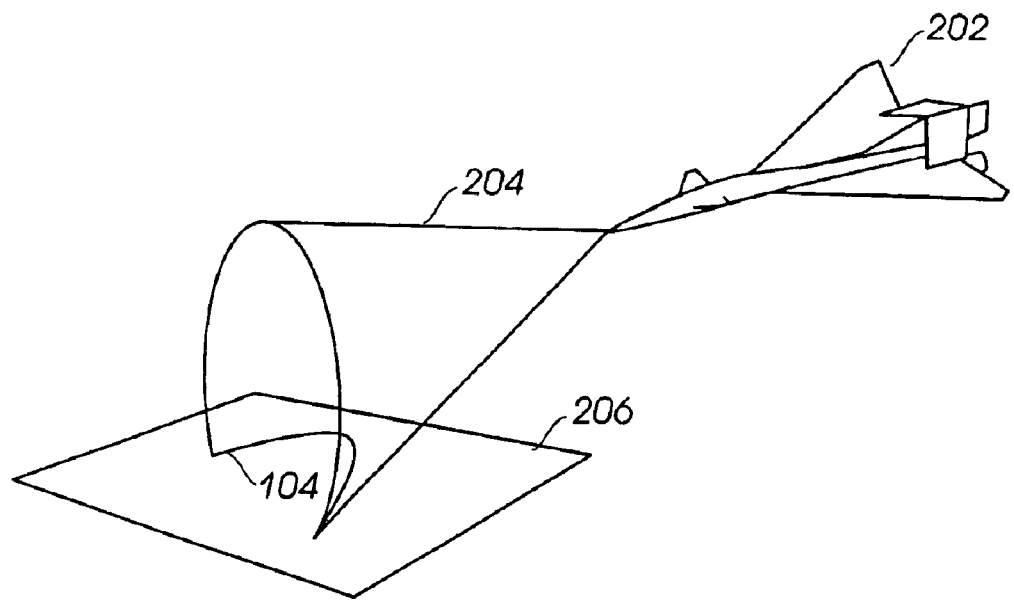
FIG. 2A is a diagram depicting a perspective view of the footprint of a sonic "carpet" boom generated by an aircraft traveling at supersonic speed.
Figure 2B:
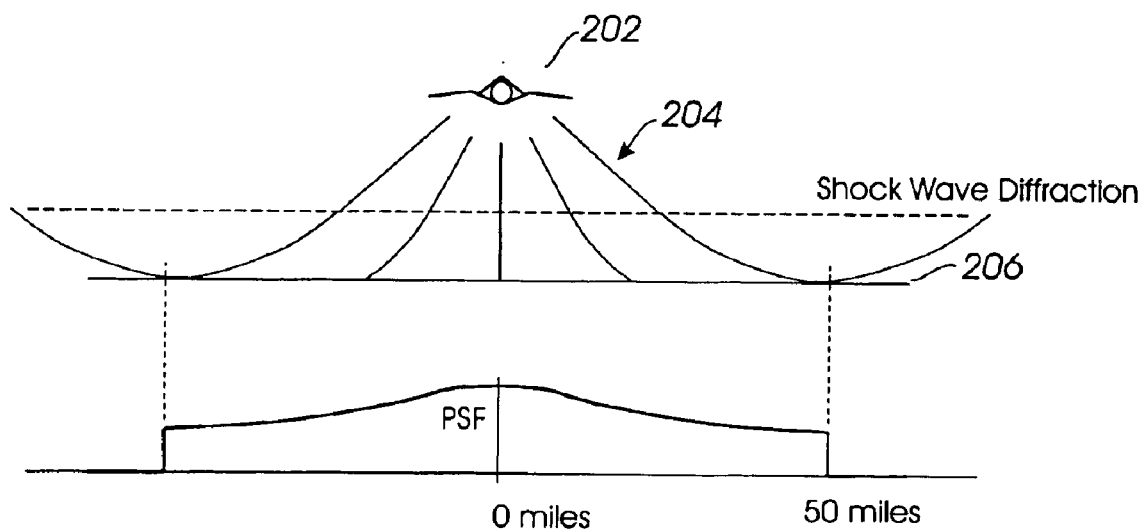
FIG. 2B is a front view of the carpet boom depicted in FIG. 2A and a graph indicating the relative strength of the sonic boom at various distances from the aircraft.

Referring to FIG. 2A, when aircraft 202 moves faster than the speed of sound and begins to outrun the pressure wave, shock wave 204 spreads forward from the nose of aircraft 202. The sonic boom heard at ground level 206 is only one portion of shock wave 204, and is referred to as a "carpet boom." Shock wave 204 spreads broadly beneath aircraft 202, as depicted in FIG. 2B. In general, shock wave 204 at ground level 206 will be approximately one mile wide for every thousand feet of altitude of aircraft 202. Therefore, a shock wave 204 generated at 50,000 feet above ground level will be approximately fifty miles wide at ground level 206. Shockwave 204 typically strikes ground level 206 forward of the point at which shock wave 204 is created, and continues along the route of aircraft 202 until aircraft 202 is moving slower than the speed of sound.

The strength of shock wave 204 is affected by various factors including the size, weight, speed, altitude, and angle of attack of aircraft 202, as well as roll, pitch, and yaw angle during flight. Atmospheric and terrain variations can also affect the intensity of shock wave 204, but variables which are under the pilot's control, such as speed, acceleration, and attitude angles, are typically more important. Increasing temperatures in the troposphere tend to diffuse shock wave 204. The strength of shock wave 204 is typically the highest directly ahead of aircraft 202, and reduces in strength with increasing distance from aircraft 202. Shock wave 204 typically diffracts off ground 206.

Figure 2C:
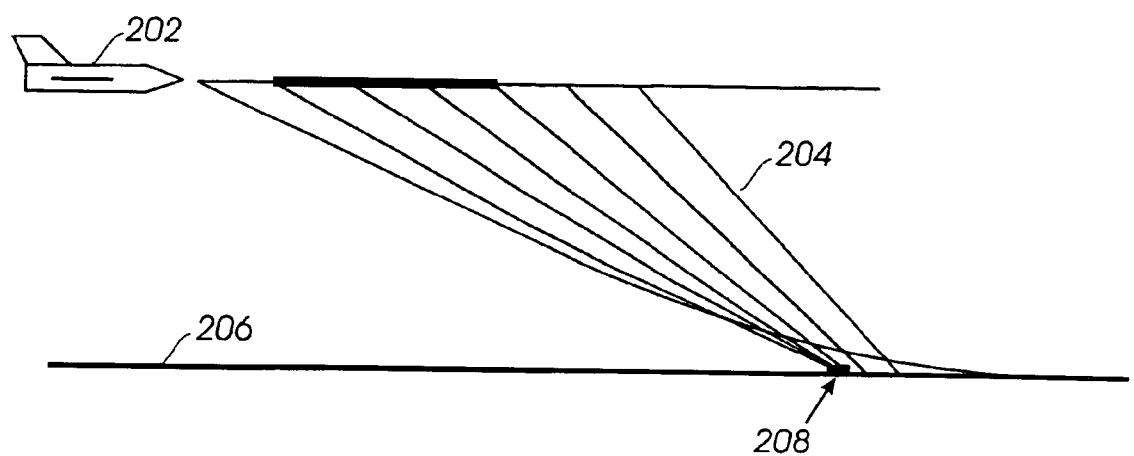
FIG. 2C is a side view of a focused carpet boom.

Changing the acceleration, angle of attack, pitch, roll, or yaw attitude of aircraft 202 can either focus or diffuse shock wave 204. A focused shock wave 204 occurs when two or more wavefronts 208, originating at different times from aircraft 202, coincide exactly, as shown in FIG. 2C. In general, deceleration and/or lifting the nose of aircraft 202 will diffuse shock wave 204; acceleration and/or dropping the nose will focus shock wave 204. A change in horizontal direction will focus shock wave 204 along the inside of the sonic boom carpet's turn, which is often however along a track to the outside of the flight path.

Referring to FIGS. 1, 2A and 2B, processing system 100 can include a variety of subsystems and sensors 114 that provide information about the operational state of aircraft 202 and systems on board aircraft 202 to processor 110. For example, speed, altitude, pitch angle, roll angle, yaw angle, bank angle, climb rate, linear and rotational accelerations, and aircraft latitude and longitude can be provided by navigation sensors such as Tactical Air Navigation (TACAN), attitude heading reference set (AHRS), inertial navigation system (INS), and global positioning system (GPS) sensors. Imaging sensors such as RADAR, FLIR, and video cameras provide information regarding the environment outside aircraft 202. Other sensors that provide information regarding the electrical system, engine, throttle position, fuel system, landing gear, and hydraulics system can also be included. Other subsystems such as a Digital Map Set (DMS), terrain awareness warning system (TAWS), and cautions and warnings subsystem (ICAW) can also be included.

Processor 110 also receives inputs from the crew station (s) including positions of switches, control sticks 130, 132, throttle levers 134, 136, and rudder pedals (not shown). Displays 102, 104, 106, 108, control sticks 130, 132, and throttle levers 134, 136 can include a variety of switches for controlling the operational modes of displays 102, 104, 106, 108, and subsystems and sensors 114. Processor 110 includes logic to determine whether the modes requested by the crewmembers are permitted based on the current mode of the components; generates images for displays 102, 104, 106, 108; and issues signals to operate any other indicators, such as stick shakers 138, 140, lights (not shown), and sounds. Mode control and option selections are also output from processor 110 to control operational modes of various subsystems and sensors 114.

Note that various embodiments of processing system 100 can be equipped with additional or fewer subsystems and sensors 114, based on the use of the aircraft. Further, redundant subsystems and sensors 114, and processors 110, can also be included to provide parallel processing capabilities and improve reliability. Additionally, processor 110 can be embodied in any suitable computing device(s) using any suitable combination of hardware, software, and/or firmware, such as microprocessors, Field Programmable Gate Arrays (FPGAs), Application Specific Integrated Circuit (ASICs), or other suitable devices and/or software modules. Various configurations of one or more displays 102, 104, 106, 108 can be utilized in a particular embodiment of processing system 100. Further, displays 102, 104, 106, 108 represent various types of head-up and head-down display devices.

Automatic flight control system (AFCS) 142 provides autopilot and automatic throttle control (ATC) mode commands to actuators connected to the control surfaces and throttle levers. The autopilot mode maintains a constant heading, altitude, speed, and/or attitude. The ATC mode positions the engine throttle levers and power lever control to maintain a constant angle of attack during landing, with approach power compensation, or constant airspeed during flight with a velocity control system. A flight management system (FMS) can be integrated with the AFCS 142 to allow the crew to select options to fly the most economical flight profile, the optimum flight profile that maintains the acoustic pressure level from shock wave 204 below a certain level, or to choose the fastest route to a destination. As the flight proceeds, the FMS can track fuel-burn and winds, update estimated flight time, and automatically change navigation and communication radio frequencies. The FMS can control the flight from takeoff through landing, and perform navigation functions including determining waypoints, course intercepts, estimated time of arrival, holding patterns, altitude crossing restrictions, and optimum holding speed.

Terrain database 144 provides latitude, longitude, and elevation data for terrain and man-made structures within a specified geographic region. Terrain database 144 may include nested components in hardware and/or software, with varying resolution and accuracy, appropriate to the phase of flight anticipated in the represented region. Terrain database 144 can be used to provide scene imagery to the pilot in low visibility conditions, to detect objects in the surrounding area (either directly through pilot scene interpretation, or automatically), and to monitor the integrity of data being used in processing system 144. Frequent updates to terrain database 144 can be provided to include changes that may affect operation of aircraft 200. For example, terrain database 144 can be updated to include recently constructed buildings and roads.

Parameters for determining the location, size, shape, color, and other display characteristics of acoustic level information and cues for displays 102, 104, 106, 108 include translational and rotational velocities and accelerations about the axes of aircraft 202, flight path angle (FPA), Mach number, angle of attack (AOA), thrust, altitude, atmospheric temperature profiles, terrain data, and aircraft length and weight. Supersonic aircraft typically fly under varying conditions of Mach, altitude, and g's pulled in a turn.

In some embodiments, formulas and/or multi-dimensional look-up tables can be used in APL cueing 144 to determine the expected acoustic level of shock wave 204. Look-up tables can include data specifically for the aircraft in which display system 100 is being used, although data for any number of aircraft can be included. The data can be based on actual flight test data, or generated using analytical computation models.

Figure 3:
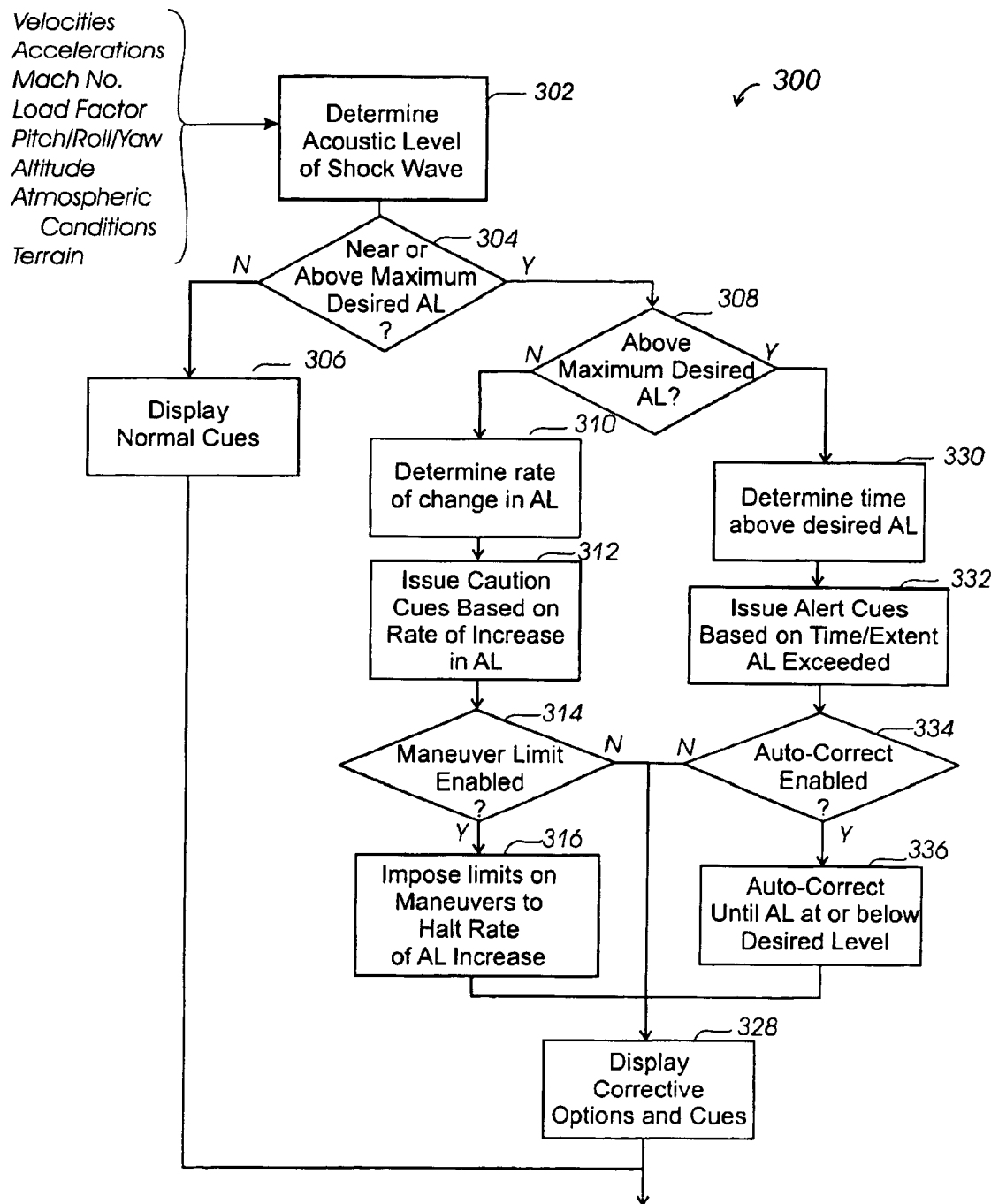
FIG. 3 is a flow diagram of an embodiment of acoustic level cueing logic.

Referring to FIG. 3, a flow diagram of an embodiment of acoustic level (AL) cueing logic 112 is shown with the aircraft's current flight characteristics being input to process 302 to determine the acoustic level of the aircraft using multi-dimensional look-up tables and/or formulas based on the current flight characteristics. Once the acoustic level is determined, process 304 determines whether the current acoustic level is above or within a predetermined range of the maximum desired acoustic level. If not, process 306 generates normal cues, without cautions or alerts, for output to displays 102 through 108, as well as other aural, tactile, and/or visual cues being utilized.

Returning to process 304, if the current acoustic level is above or near the maximum desired acoustic level, process 308 determines whether the maximum desired acoustic level has been exceeded. If not, process 310 determines the rate of increase or decrease in the acoustic level. If the acoustic level is increasing, process 312 issues caution cues based on the rate of increase. Similarly, if the acoustic level is decreasing, the urgency of the cues can be reduced proportionally.

In some embodiments, an option can be included in the crewstation to enable or disable maneuver limit logic to further prevent control inputs that would cause the acoustic level to increase further. For example, a large spike in the acoustic level can occur when an aircraft is flying near Mach 1.2, and the pilot enters a hard (steep) turn. In such a situation, with maneuver limiting enabled, process 316 can limit the amount of control stick 130, 132 (FIG. 1) input that is sent to the control surfaces to prevent the bank angle of the aircraft from exceeding an amount that would cause the acoustic level to exceed the desired level. Limits on other inputs or changes to the flight condition of the aircraft that are likely to cause the desired acoustic level to be exceeded can also be implemented in processes 314 and 316.

Returning to process 308, if the maximum desired acoustic level is being exceeded, process 320 determines the amount of time the aircraft has been exceeding the desired acoustic level. Process 322 can raise the urgency level of the cues based on the amount of time the desired acoustic level was exceeded. In some embodiments, an option can be included in the crewstation to enable or disable auto-correct logic to automatically make changes to the flight condition of the aircraft to reduce the acoustic level of the engine and airframe noise or shock wave to the desired level.

Once processes 310 through 316, or 320 through 326, are executed, process 328 displays options and cues to indicate changes that the crewmembers can make to reduce the acoustic level of the aircraft. For example, options to reduce speed, acceleration, pitch angle, and/or bank angles can be provided via voice, tactile, or visual cues.

Figure 4A:
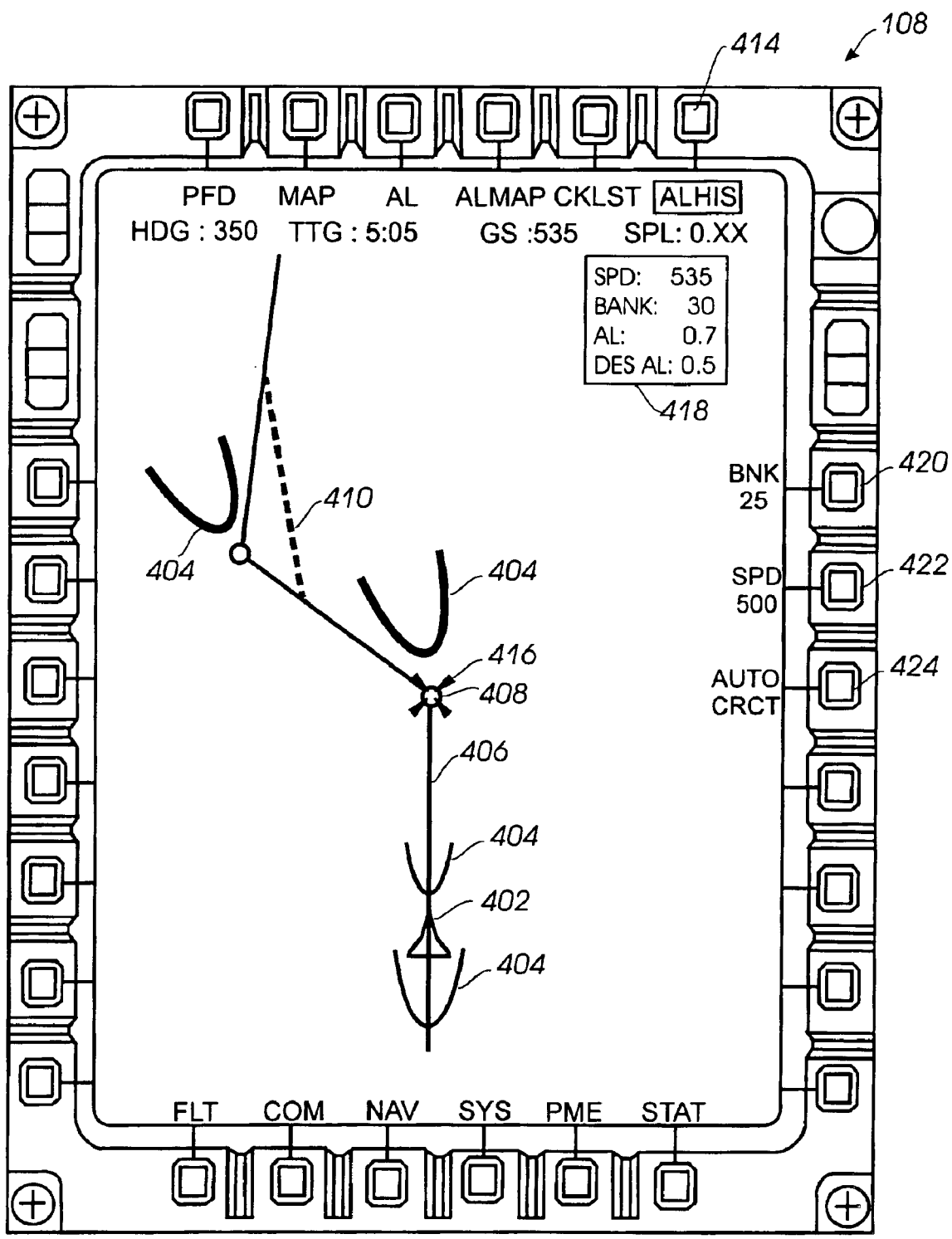
FIG. 4A is a diagram of an embodiment of an aircraft display that can be utilized to provide information to crewmembers regarding acoustic pressure levels at ground level caused by their aircraft during supersonic flight.

Referring to FIG. 4A, an embodiment of display 108 that can be utilized to provide information to crewmembers regarding previous, current, and predicted acoustic pressure levels at ground level caused by their aircraft during supersonic flight is shown. In some embodiments, display 108 includes aircraft symbol 402, acoustic signature (AS) symbols 404, as well as symbols representing the aircraft's navigation route 406, navigation waypoints 408, and one or more alternate navigation routes 410 that may be taken to avoid flight over certain areas, such as densely populated areas or noise-restricted areas.

Acoustic signature symbols 404 can represent the footprint of previous, current, and predicted shock waves that have been, are, or are likely to be, generated during supersonic flight as the air in front of the aircraft is compressed.

In some embodiments, one acoustic signature symbol 404 can be positioned near aircraft symbol 402 to indicate the probable location at ground level, size and/or strength of the acoustic signature currently being generated by the aircraft. One or more acoustic signature symbols 404 can be displayed behind aircraft symbol 402 when the crewmember selects acoustic level history 414 option to display the history of acoustic signature symbols 404, such as Acoustic Level History (ALHIS) option 414.

As a further option, acoustic signature symbols 404 can be displayed when the aircraft is within a predefined range of an expected maneuver point to show the expected footprint of shock wave 204 or other acoustic signature during the maneuver. For example, pilots of commercial aircraft typically limit the amount of bank angle during flight for the comfort of the passengers on board. Displays 108 can therefore present acoustic signature symbols 404 at waypoints indicating the expected strength of the shock wave or engine/airframe noise at a standard bank angle, such as 30 degrees bank angle at the current speed. Displays 108 can also show predicted acoustic signature values at various points along the entire flight profile.

In some embodiments, if a particular waypoint 408 is selected using one of various selection devices, such as a pilot-controlled cursor 416, on display 108, information regarding the acoustic level expected to result during the turn to the next waypoint 408 can be presented. For example, display 108 can present information window 418 that includes the predicted pressure disturbance level at the current speed and expected bank angle, as well as the desired pressure disturbance level. Display 108 can also present alternate route 410 that minimizes the amount of bank angle required to turn to stay on course. Such information can be presented to the crewmembers on the ground during flight planning as well as enroute.

In further embodiments, selectable maneuver limit options 420, 422 can be presented on display 108 to indicate flight condition parameters that can be varied to stay below a desired pressure disturbance level during the upcoming maneuver. For example, option 420 indicates the maximum bank angle that can be used at the current speed to stay within the desired acoustic level. Option 422 indicates the maximum speed for the aircraft during the turn to remain within the desired acoustic level. Other suitable parameters and indicators can be presented to indicate options to the crewmembers for staying at or below the desired acoustic level during an upcoming maneuver or portion of flight. Once maneuver limit option 420, 422 is selected, AL cueing logic 112 (FIG. 1) will impose limits on crewmember inputs that affect the associated parameter during the upcoming maneuver or portion of flight. The crewmembers can alternatively use the values of the parameters shown near options 420, 422 to manually control the aircraft's flight conditions to stay within the desired acoustic level.

Window 418 can be presented whether or not cursor 416 is positioned over another symbol on display 108 to indicate the current and desired acoustic level. Additionally, when cursor 416 is positioned over another symbol on display 108, window 418 can be presented adjacent the selected symbol. Information in window 418, and adjacent maneuver limit options 420, 424 can be updated as various parameters, that affect the engine/airframe noise or shock wave, change during flight.

Display 108 can also include auto-correct option 424 that can be selected to enable AL cueing logic 112 (FIG. 1) to automatically adjust one or more flight parameters to reduce the acoustic level of the aircraft to be at or below the desired acoustic level. Auto-correct option 424 can be displayed and enabled at all times during the flight, or alternatively, only when the acoustic level of the shock wave is approaching or exceeds the maximum desired acoustic level.

Figure 4B:
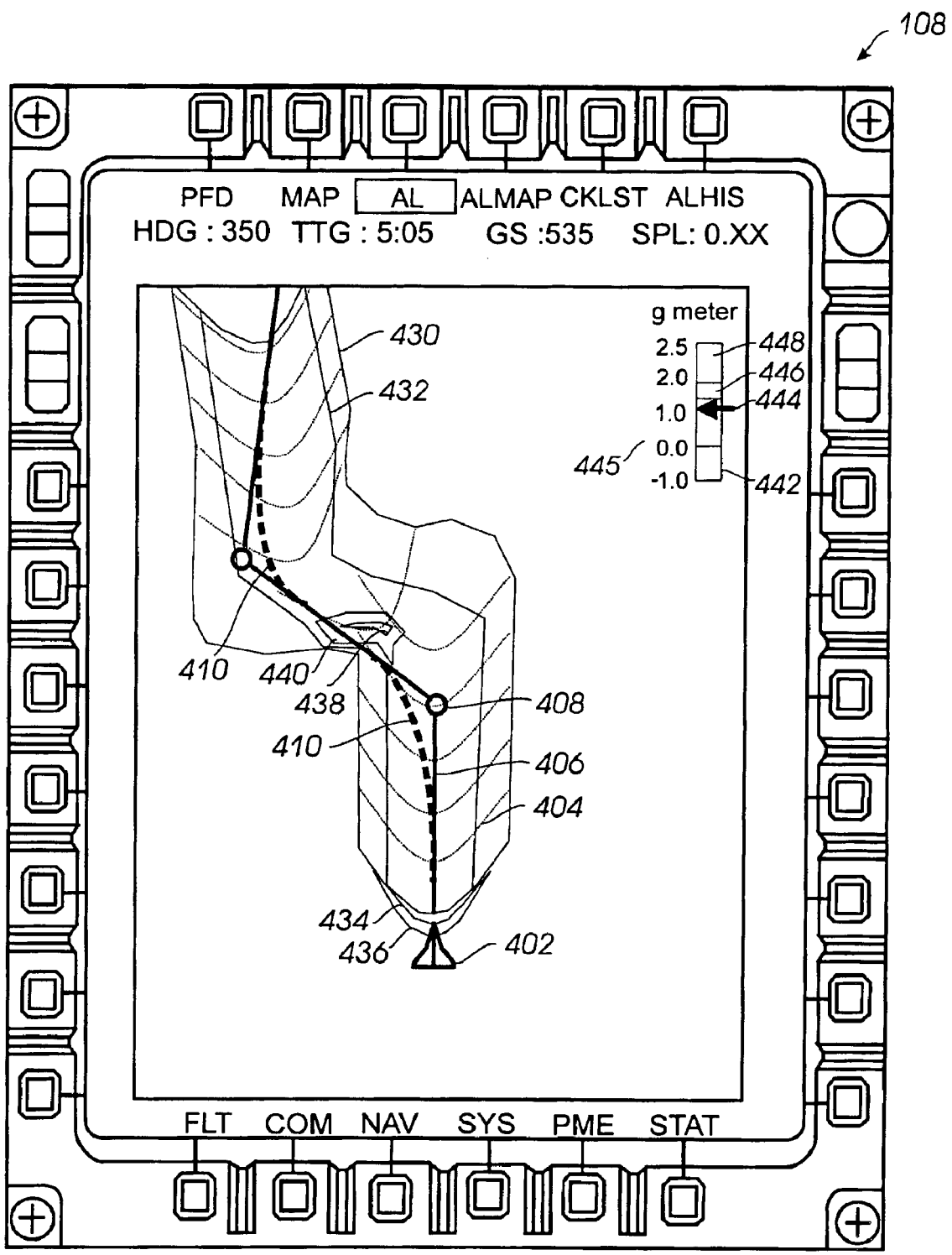
FIG. 4B is a diagram of another embodiment of an aircraft display that can be utilized to provide information to crewmembers regarding acoustic pressure levels at ground level caused by their aircraft during supersonic flight.

Referring to FIG. 4B, another embodiment of display 108 that can be utilized to provide information to crewmembers regarding previous, current, and predicted acoustic pressure levels at ground level caused by their aircraft during takeoff/landing and supersonic flight is shown. In some embodiments, display 108 includes one or more acoustic loudness contours 430, 432 as well as aircraft symbol 402, acoustic signature (AS) symbols 404, aircraft's navigation route 406, navigation waypoints 408, and alternate navigation routes 410.

Acoustic loudness contours 430, 432 can represent the footprint of previous, current, and predicted shock waves acoustic levels that have been, are, or are likely to be, generated by takeoff/landing engine and airframe noise or during supersonic flight as the air in front of the aircraft is compressed.

Acoustic signature symbols 404 represent boom intercepts at ground level that were calculated at time T, T+t1, T+t2 . . . T+tn. Locations where booms occur twice, are spread out, or are focused, can be determined from the intercepts. Acoustic signature symbols 404 may or may not be desired by the pilot, but can be used to determine the ground shock strength, loudness, time of intercept, or other parameters associated with the acoustic level near the ground. Acoustic loudness contours 430, 432 represent a constant pressure level, and can be presented in different colors on display 108 to represent varying pressure levels.

Focused boom contours 434, 436 represent the focused boom that occurs when the aircraft accelerates from subsonic to supersonic flight. Preplanned routing could be used to place the focused booms in a location where annoyance would be reduced, such as over the ocean. Increased strength contours 438, 440 can be presented along route 406 to represent a maneuver that is likely to cause an increase in the strength of the sonic boom that is likely to be avoided with a change in routing, as represented by alternate route 410. Areas between contours 430, 432, 434, 436, 438, 440 can be color coded to indicate the acoustic level.

Another useful feature that can be included in some embodiments of display 108, or other displays, is an acoustic level 'g' meter acceleration (g) warning display 442 that is calibrated with maximum allowable sonic boom strength. Since the current heading, Mach number, altitude, and weight of the aircraft are generally known, the parameters that dominate importance for boom strength are the acceleration forces on the aircraft. An indicator line 444 could increase in length and showing the current g-value of the aircraft can change color, for example from green position relative to yellow to red, g-scale 445 as flight conditions change toward increasing boom strength. As an example, the following table shows combinations of acceleration and cutoff Mach number above which indicator line 444 would be red in region 448 to indicate an acoustic level being generated above the desired acoustic level:

| Acceleration | Cutoff Mach # |
| --- | --- |
| above 1.10 | 1.5 |
| above 1.15 | 1.4 |
| above 1.25 | 1.3 |
| above 1.40 | 1.2 |

As flight conditions move toward increasing boom strength, the bottom of regions 446, 448 can change primarily with Mach number. Regions 446, 448 can be color coded to indicate severity of acoustic level, for example, region 446 can be yellow, and region 448 can be red. Additional or fewer warning regions can be utilized. The numerical values of g-scale 445 can also change, such as when turning at speeds near the cutoff Mach number to prevent a focused shock wave during a maneuver, for example.

G-warning display 442 informs the pilot of actions that should not be taken during flight. G-warning display 442 can also be linked to other cues, such as stick shakers 138, 140 (FIG. 1), to cue the pilot when the aircraft's flight conditions are entering the warning zone. During takeoff and landing conditions, g-warning display 442 can be reconfigured to indicate thrust level warning. In such conditions, g-scale 445 can be reconfigured to indicate throttle lever percentage, while indicator line 444 indicates current throttle level, and regions 446, 448 indicate warning regions.

Figure 5:
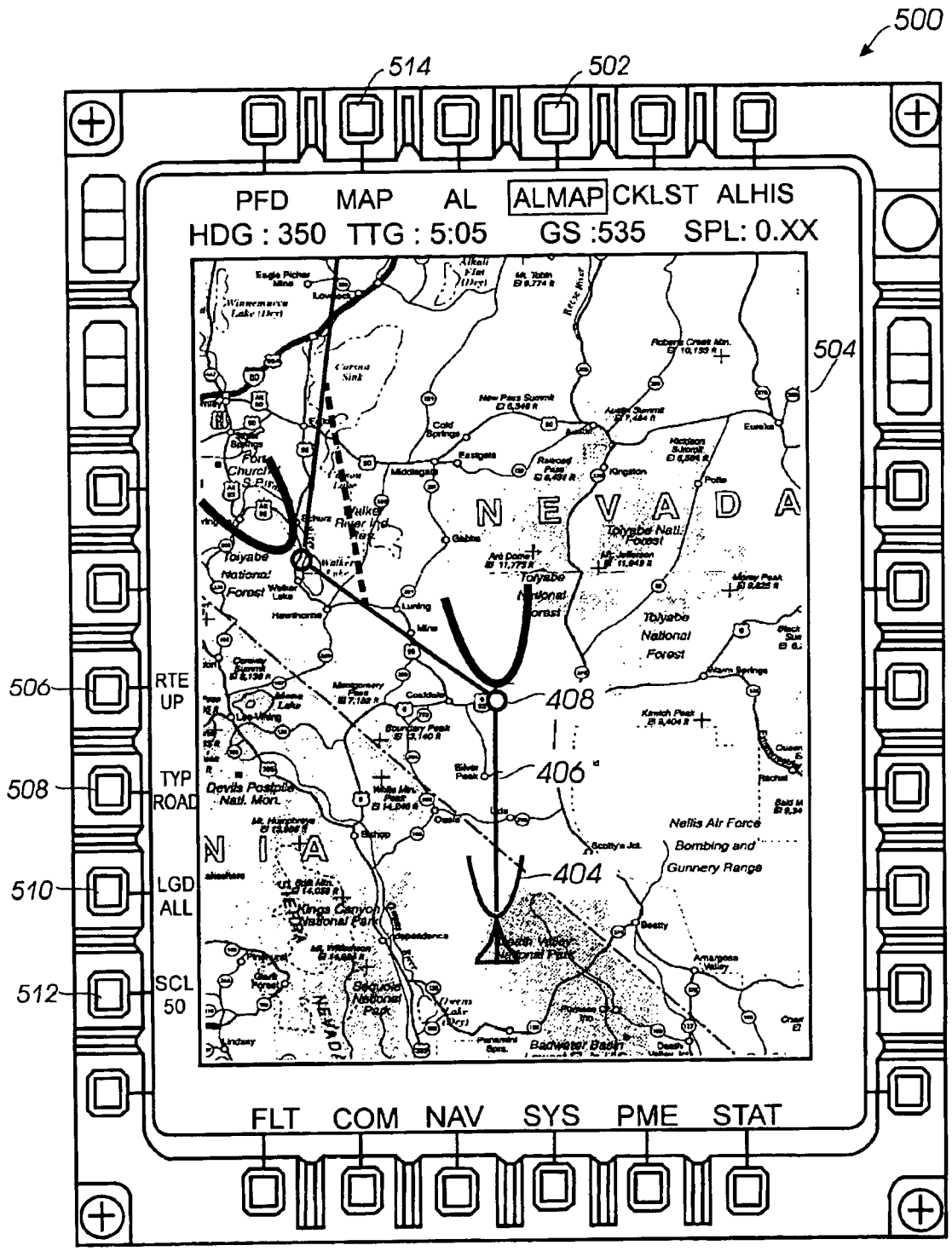
FIG. 5 is a diagram of another embodiment of an aircraft display that can be utilized to provide information to crewmembers regarding acoustic pressure levels at ground level caused by their aircraft during supersonic flight.

Referring to FIGS. 2A and 5, FIG. 5 shows display 500 with ALMAP option 502 selected to display acoustic pressure level cues overlaid on map 504. Map 504 represents the geographic area along the aircraft's planned flight route and provides a visual image of the position of the aircraft with respect to the ground below.

Additional selectable options can be implemented for display 500, such as map orientation option 506, map type option 508, legend features declutter option 510, and map scale option 512. Map orientation option 506 can allow the user to select different orientations for map 504, such as north-up or route-up. Map type option 508 can allow the user to select different types of maps, such as various types of aeronautical, topographical, and road maps. Legend features declutter option 510 can include options to add or remove various symbols and features associated with map 504 to allow a clearer view of other images on display 500, such as acoustic signature symbols 404. Map scale option 512 allows the user to change the scale of map 504 as presented on display 500. When map scale option 512 is selected, the scale and position of route symbols 406, waypoint symbols 408, and acoustic signature symbols 404, as well as the scale of map 504, changes accordingly. Other suitable options can be implemented with display 500, such as map option 514 that allows the user to display only map 504 without any other symbols and information.

Additionally, population density information can be included in terrain database 144 (FIG. 1) and accessed by AL cueing logic 112 (FIG. 1) to generate cues based on the population density of the area subject to the acoustic signature. The higher the population density, the more urgent the cues can be to alert the crewmembers to reduce the acoustic level to the desired level.

Figure 6:
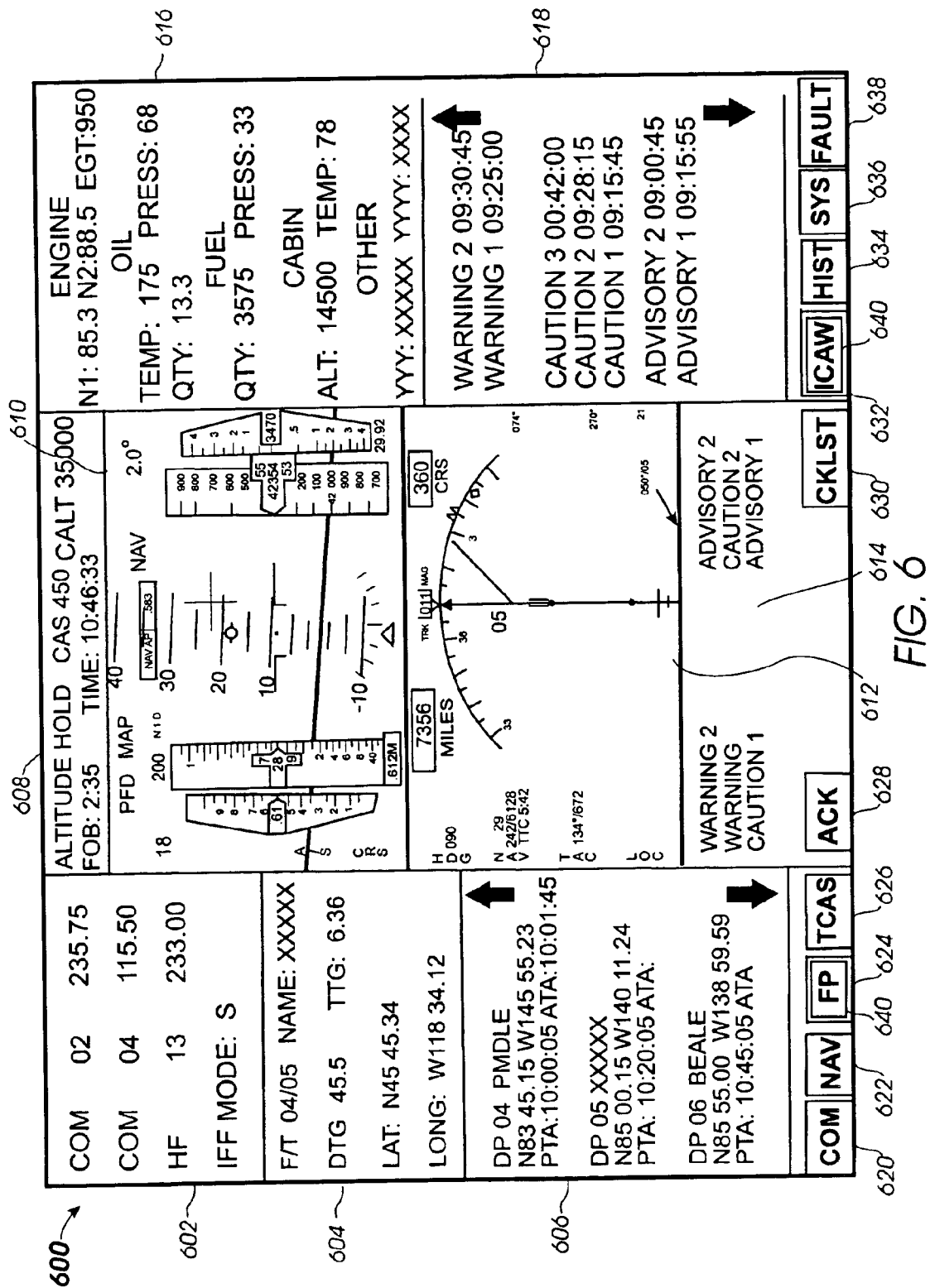
FIG. 6 is a diagram of another embodiment of an aircraft display that can be utilized to provide information to crewmembers regarding acoustic pressure levels at ground level caused by their aircraft during supersonic flight.

Referring to FIGS. 1 and 6, FIG. 6 shows another embodiment of an avionics display 600 that can include information regarding the aircraft and the acoustic level including shock wave 204 (FIG. 2A). Display 600 includes communication system window 602, navigation window 604, common window 606 (currently displaying navigation waypoint information), primary information window 608, Attitude Director Indicator (ADI) window 610, Horizontal Situation Indicator display (HSID) window 612, common window 614 (currently displaying caution a nd warning information), engine status window 616, and common window 618 (currently displaying cautions and warnings information). ADI window 610 provides flight attitude, altitude, speed, and navigation steering information. HSID window 612 provides aircraft attitude, steering, and navigation information.

The information in ADI window 610, Horizontal Situation Indicator display (HSID) window 612, and other windows on display 600 can alternatively be presented alone on separate displays, such as displays 102, 104.

The embodiment of avionics display 600 shown in FIG. 6 also includes communication subsystems (COM) option 620, navigation subsystems (NAV) option 622, flight planning subsystem (FP) option 624, traffic alert and collision avoidance subsystem (TCAS) option 626, acknowledge (ACK) option 628, checklist (CKLST) option 630, integrated cautions and warnings (ICAW) subsystem option 632, subsystem history (HIST) option 634, subsystem (SYS) option 636, and subsystem diagnostics (FAULT) option 638. Crewmembers can choose options 620 through 638 to view more detailed information about the aircraft's operation and subsystems in common windows 606, 614, and 618.

The options shown for common window 606 include Com option 620 to view more detailed information regarding the aircraft's communication system 604; NAV option 622 to view information about various aspects of navigating the aircraft; FP option 624 to review and modify the aircraft's flight plan; and TCAS option 626 to view more information regarding other aircraft or obstacles in the vicinity of the aircraft. When a particular one of options 620 through 626 is selected, an indicator of the option selected, such as selected box 640 or lighted pushbuttons, can be utilized. For example, a green light can indicate a selected option, and white light can indicate the option is available for selection.

When one of options 620 through 626 is selected, the information in common window 606 changes to display with information requested by the user. A display option tree can be implemented to allow each crewmember to access increasingly detailed levels of information in common windows 606, 614, 618 independently from one another. While a first crewmember is monitoring engine performance, for example, the other crewmember can view and change the flight plan. Additionally, when COM option 620 is selected by one crewmember, options 620 through 626 on his display 600 change to another set of options to access another level of information that is available for the selected COM option 620. The sublevels include a feature, such as a BACK option, to return to the previous level. In the meantime, the information on the other crewmember's display 600 is unaffected, unless the option selected by the first crewmember changes the operating mode or other information that is common to both displays 600.

Acknowledge (ACK) option 628 and checklist (CKLST) option 630 are associated with an Integrated Caution Advisory and Warning subsystem (ICAW) (not shown). In the embodiment of display 600 shown, messages generated by ICAW system 606 appear in window 614. A limited number of individual ICAW messages can appear at one time in window 614, and additional information about the messages can appear in window 618 when ICAW option 632 is selected. The ICAW messages in window 614 can be cleared by selecting ACK option 628. When additional messages are available, they replace the caution and warning messages that are cleared when ACK option 628 is selected.

ICAW subsystem can include an electronic checklist feature that is accessed via CKLST option 630. When an ICAW message is displayed in window 614, the crewmember can depress CKLST option 630 to view the associated checklist in window 614. When multiple ICAW messages occur, the crewmember can move an indicator over the desired ICAW and select ICAW option 632 to view a checklist for the problem indicated by the message. Crewmembers can also manually page through the checklists at any time by selecting CKLST option 630.

AL cueing logic 112 (FIG. 1) can be integrated with the ICAW subsystem, and information and symbols generated by AL cueing logic 112 can be presented in any suitable area of display 600, such as window 614, 618, 610, and 612. If a caution or advisory generated by AL cueing logic 112 appears in window 614, the caution or advisory and ICAW option 632 can be selected, and further information can be presented in window 618.

Subsystem history (HIST) option 634 can be selected to display operational history for the subsystem selected with subsystem (SYS) option 636. FAULT option 638 can be selected to initiate diagnostic procedures, commonly referred to as Built-in-Tests (BIT), on the selected subsystem. The results of the BIT are displayed in window 618. Information regarding previous acoustic levels generated by the aircraft can also be accessed via history option 634.

Referring to FIGS. 1 and 6, in some embodiments, processor 110 determines whether the aircraft is in a predefined state, and displays predefined information in at least one of windows 602 through 616 while the aircraft remains in the predefined state. Additionally, options 620 through 638 can be changed or enabled/disabled depending on the aircraft state. For example, when the aircraft is on final approach to land, one or both of the crewmember's displays 600 can be forced to display primary flight information or other information considered necessary to conduct that portion of the flight in windows 610 and 612, as well as other windows on display 600.

Various other techniques for controlling the content in common windows 606, 614, and 618 can be provided. For example, a "drag and drop" feature can be provided as another method of displaying more detailed information about one or more of the subsystems. The drag and drop feature allows a user to select a word or other item in one of windows 602, 604, 608, 610, 612, or 616, and drag the selection to one of common windows 606, 614, or 618. Information regarding the selected item is then displayed in the common window in which the item was dropped. For example, selecting a particular caution in window 614 and dropping it in window 618 would cause information regarding the relevant subsystem to be displayed in window 618.

Other techniques for controlling the appearance of display 600 can also be provided, such as automatic and manual declutter display modes, voice recognition and response systems, color-coding, and display scaling. Further, other combinations of information and number/size of windows can be implemented for display 600. A lock out feature can also be included to help crewmembers coordinate their efforts by preventing them from attempting to control operation of the same subsystem simultaneously. Alternatively, control can be given to the last crewmember that makes an input.

Processing system 100 and AL cueing logic 112 were discussed herein as examples of types of systems, logic, and display formats that can be used to provide information regarding the acoustic levels of the engine/airframe noise and shock wave generated by the aircraft. Embodiments of AL cueing logic 112 alerts crewmembers of the level of acoustic disturbance that have been caused, and are likely to be caused, under current flight conditions. AL cueing logic 112 also provides cues to the crewmembers indicating modifications to the flight condition that could lessen the severity of the disturbance. In some circumstances, options can be selected to enable AL cueing logic 112 to limit a pilot's ability to execute maneuvers that would cause sonic boom disturbances above a predetermined level, and to automatically adjust one or more flight parameters to reduce the acoustic level to a level at or below the desired level.

While the present disclosure describes various embodiments of acoustic signature displays, it will be understood that many variations and modifications of the embodiments disclosed herein may be made while remaining within the scope of the following claims. These embodiments are illustrative and the scope of the claims is not limited to them. For example, those having ordinary skill in the art will readily implement the processes necessary to provide the structures and methods disclosed herein, and will understand that materials, dimensions, processes, and other parameters can be varied to achieve desired apparatus, methods, and systems within the scope of the following claims. Further, other embodiments of displays, systems, sensors, processors, and methods can be configured to provide acoustic level information for operation of other types of vehicles and machinery besides aircraft in both autonomous and/or manual operating modes. In the claims, unless otherwise indicated the article "a" is to refer to "one or more than one".

What is claimed is:

1. A system for controlling the acoustic signature of a device, comprising:
a processor operable to:
receive information regarding the operating condition of the device;
determine the current acoustic level of the device based on the current operating condition information;
generate a signal indicating the acoustic level;
generate at least one signal that can be used to control the operating condition of the device to achieve a desired acoustic level; and
determine a rate of increase in the acoustic level.

2. The system according to claim 1 wherein the processor is further operable to determine whether the level of the device acoustic signature is above the desired level.

3. The system according to claim 1 wherein the processor is further operable to generate at least one advisory cue based on the rate of increase of the acoustic level.

4. The system according to claim 1 wherein the processor is further operable to detect selection of an option to limit maneuvers of the device.

5. The system according to claim 1 wherein the processor is further operable to display symbols indicating changes to the operating condition that can be made to control the current acoustic level.

6. The system according to claim 1 wherein the processor is further operable to determine the amount of time the acoustic level has exceeded the desired acoustic level.

7. The system according to claim 6 wherein the processor is further operable to issue alert cues indicating urgency to reduce the acoustic level based on the amount of time and the extent to which the acoustic level has exceeded the desired acoustic level.

8. The system according to claim 1 wherein the processor is further operable to generate signals to automatically control operating conditions to reduce and maintain the acoustic level within the desired acoustic level.

9. The system according to claim 1 wherein the processor is further operable to generate signals to indicate at least one previous value of the acoustic level.

10. The system according to claim 1 wherein the processor is further operable to generate signals to indicate at least one predicted value of the acoustic level based on expected maneuvers and operating conditions.

11. The system according to claim 1 wherein the processor is further operable to generate signals to indicate an alternate navigation route that requires less maneuvering to reduce variation in the acoustic level from the desired acoustic level.

12. The system according to claim 1 wherein the processor is further operable to generate signals to allow a crewmember to select a feature on a display and generate information regarding the acoustic level associated with the selected feature.

13. The system according to claim 1 wherein the processor is further operable to generate an aural cue based on the acoustic level.

14. The system according to claim 1 wherein the processor is further operable to generate a tactile cue based on the acoustic level.

15. The system according to claim 1 wherein the processor is further operable to generate a color-coded visual cue based on the acoustic level.

16. The system according to claim 1 wherein the processor is further configured to generate a cue indicating the strength of the acoustic level based on a combination of Mach number, altitude, device weight and acceleration.

17. The system according to claim 1 wherein the processor is further configured to generate a contour line indicating the pressure level of the shock wave acoustic signature.

18. A system for controlling the acoustic signature of a device, comprising:
a processor operable to:
receive information regarding the operating condition of the device;
determine the current acoustic level of the device based on the current operating condition information;
generate a signal indicating the acoustic level;
generate at least one signal that can be used to control the operating condition of the device to achieve a desired acoustic level; and
detect selection of an option to limit maneuvers of the device.

19. The system according to claim 18 wherein the processor is further operable to display symbols indicating changes to the operating condition that can be made to control the current acoustic level, wherein the changes include at least one of the group of: reducing acceleration, reducing velocity, and reducing bank angle.

20. The system according to claim 18 wherein the processor is further operable to generate signals to indicate a history of the device's acoustic level.

21. The system according to claim 18 wherein the processor is further operable to generate signals to indicate a navigation route that requires less maneuvering to reduce variation in the acoustic level from the desired acoustic level.

22. The system according to claim 18 wherein the processor is further operable to generate signals to allow a user to select a feature on a display and generate information regarding the acoustic level associated with the selected feature.

23. The system according to claim 18 wherein the processor is further operable to vary the size of the cue based on a acoustic level.

24. The system according to claim 23 wherein the processor is further operable to vary the shape of the cue based on the acoustic level.

25. The system according to claim 18 wherein the processor is further operable to generate signals to indicate a navigation route around densely populated areas.

26. The system according to claim 18 wherein the processor is further operable to display a terrain map in the vicinity of the device and cues overlaying the terrain map indicating the footprint of the device's acoustic signature on the terrain map.

27. The system according to claim 26 wherein the processor is further configured to determine the acoustic level using multi-dimensional data tables based on Mach number, altitude, weight and acceleration, and bank angle of the device.

28. The system according to claim 18 wherein the processor is further configured to generate a contour line indicating the pressure of the acoustic level.

* * * * *